United States Patent [19]

Spencer et al.

[11] Patent Number: 5,578,763
[45] Date of Patent: Nov. 26, 1996

[54] ELECTROMAGNETIC FLOW METER

[75] Inventors: Jordan L. Spencer; David C. Rodgers, both of Tenafly, N.J.

[73] Assignee: The Trustees of Columbia University in the City of New York, New York, N.Y.

[21] Appl. No.: 493,622

[22] Filed: Jun. 22, 1995

[51] Int. Cl.⁶ .................................................. G01F 1/58
[52] U.S. Cl. .................................. 73/861.08; 73/861.13
[58] Field of Search ............................ 73/239, 861.04, 73/861.05, 861.08, 861.71, 861.09–861.17

[56] References Cited

U.S. PATENT DOCUMENTS

| | | |
|---|---|---|
| 3,605,741 | 9/1971 | Spencer . |
| 3,662,598 | 5/1972 | Spencer . |
| 4,003,255 | 1/1977 | Spencer ................... 73/861.71 |
| 4,041,756 | 8/1977 | Head et al. ................. 73/861.71 |
| 4,051,723 | 10/1977 | Head et al. . |
| 4,167,115 | 9/1979 | Stoever ..................... 73/861.71 |
| 4,507,976 | 4/1985 | Banko ....................... 73/861.54 |
| 4,944,190 | 7/1990 | Scally et al. ............... 73/861.56 |

*Primary Examiner*—Richard Chilcot
*Assistant Examiner*—Max H. Noori
*Attorney, Agent, or Firm*—Brumbaugh, Graves, Donohue & Raymond

[57] ABSTRACT

A flow meter comprises a conduit adapted to conduct a flow of a fluid, a stop in the conduit, and a body that is movably received in the conduit, is normally kept in engagement with the stop by the fluid flow, and has at least a portion of a magnetically responsive material. An electromagnet is located outside the conduit in a position upstream from the stop, relative to the direction of the fluid flow, and has its poles located such as to impose a magnetic force on the magnetically responsive material of the body when it is energized. A ramp current generator energizes the electromagnet so as to progressively increase the magnetic force that it produces until the magnetic force is sufficient to move the body against the fluid flow and attract the body to a position between the poles. A multi-turn sensor coil or a magnetic field sensor detects changes in the magnetic flux field of the electromagnet when the body moves away from the stop and toward the electromagnet and outputs a sensing signal, which in turn initiates the capture of a measurement of the current that resulted in attraction of the body away from the stop against the force of the fluid flow.

6 Claims, 3 Drawing Sheets

ELECTROMAGNETIC FLOW METER

BACKGROUND OF THE INVENTION

The flow rate of a fluid flowing in a flow system at slow to moderate rates can be measured by placing a magnetically responsive body in a flow conduit having a stop against which the body rests under the influence of the fluid flow (and gravity in a vertically downward or sloping mode) and determining the force required to be exerted on the body by an electromagnet located upstream from the stop to move the body away from the stop. With the body resting on the stop, the current supplied to the electromagnet is increased from zero (or a level below that which causes the body to leave the seat). When the current reaches a certain level, the magnetic force applied to the body becomes large enough to move the body upstream against the flow. Inasmuch as the magnetic force exerted on the body rapidly increases as soon as the body starts moving toward the electromagnet, the body rapidly moves against the flow into a position between the magnetic poles. By measuring accurately the current supplied to the electromagnet when the body moves away from the stop, one has a value that can be converted into a flow rate value based on calibration data. Movement of the body away from the stop has previously been detected by optical sensors. U.S. Pat. No. 4,003,255 (Spencer, Jan. 1977, "the '255 patent") describes and shows a flow measuring system of the type just described. The '255 patent is incorporated by reference into the present disclosure.

Other fluid flow measuring systems based on magnetic attraction of magnetically responsive bodies and optical sensing of movements of the bodies have been proposed, such as those of U.S. Pat. Nos. 4,041,723 (Head et al., October 1977); 3,662,598 (Spencer, May 1972); 3,605,741 (Spencer, September 1971); and 4,167,115 (Stoever, September 1979).

Optical sensing requires that the flow conduit and the fluid be transparent and is also subject to malfunction due to false indications of ball movement caused by ambient light incident on the light detector. Ambient light conditions can, for example, cause inaccuracies in the measurements due to variations in the position of the body along the path it takes between the stop and the magnet when a signal indicative of the movement of the body is generated.

SUMMARY OF THE INVENTION

One object of the present invention is to provide a flow meter that does not require the use of a transparent conduit and that can be used to measure flows of non-transparent fluids. Another object is to provide a flow meter that is not subject to inaccurate measurements due to ambient light. It is also an object to provide a flow meter detection unit that can be retrofitted into existing flow meters of other types, such as rotameters, in a manner that permits the existing meter to continue in use as a back-up or corroboratory measurement device.

The foregoing and other objects are attained, in accordance with the present invention, by a flow meter comprising a conduit adapted to conduct a flow of a fluid, a stop in the conduit, and a body movably accommodated in the conduit and normally engaging the stop under the influence of the fluid flow, the body including at least a portion of a magnetically responsive material. An electromagnet is located outside the conduit in a position upstream from the stop relative to the direction of fluid flow and is positioned with its poles at a location such as to impose a magnetic force on the magnetically responsive material of the body when energized so as to move the body away from the stop. A controllable power supply energizes the magnet so as to progressively increase the magnetic force output of the electromagnet until the magnetic force is sufficient to move the body against the fluid flow and attract the body to a position between the poles. Movement of the body away from the stop by the magnetic force is sensed by detecting the change in magnetic flux in the electromagnet when the body moves to a position between the poles, and a sensing signal indicative of such movement is generated. The magnitude of the current supplied to the electromagnet is detected in response to the sensing signal, and a measurement signal indicative of that current is generated.

The present invention makes use of the fact that when the body is attracted away from the stop and toward the gap between the poles of the electromagnet, the flux density of the magnet changes at a rate significantly different than the rate at which it changes when the current is increased but the body remains against the stop. The change in the rate of change in the flux density is due to the fact that the magnet becomes "short-circuited" or shunted when the body moves between the poles. By detecting the change in the rate of change in the flux density of the electromagnet, movement of the body away from the stop toward the gap between the magnetic poles is clearly indicated. Such detection is free of the limitations of optical detection referred to above.

The change in the rate of change in the flux density of the electromagnet during a measurement cycle may be detected by various means. One such means is a multi-turn coil of electrically conductive material wound around a portion of the electromagnet. The change in flux density induces a voltage in the coil, and that voltage is a suitable sensing signal. Another suitable device for detecting the change in the rate of change in flux density resulting from movement of the body away from the stop is a Hall effect sensor mounted on the electromagnet. The voltage output of the Hall effect sensor changes when the flux field cutting through it changes, and the change in voltage is a suitable sensing signal.

When a Hall effect sensor is used in the device, it may be mounted in a recess in a pole of the electromagnet in an orientation such that its poles are intersected by different numbers of magnetic flux lines when the body is seated on the stop and when the body is moved from the stop by the magnetic force of the electromagnet. Alternatively, the Hall effect sensor may be mounted in a recess in a portion of the electromagnet remote from the poles so as to detect the increase in the density of the flux flow within the core of the electromagnet when the body is moved from the stop by the magnetic force and more flux lines pass through the recess in which the sensor is mounted.

The flow meter may be configured to be installed in a fluid flow pipe or in an existing flow meter of another type, such as a rotameter, by providing a housing with the meter flow conduit extending through it, the housing being externally configured to be accommodated within a pipe or flow meter passage through which the fluid is flowing. The electromagnet and sensor of the flow meter are mounted in the housing.

For a better understanding of the invention, reference may be made to the following description of an exemplary embodiments, taken in conjunction with the accompanying drawings.

DESCRIPTION OF THE EMBODIMENTS

Figure 1:
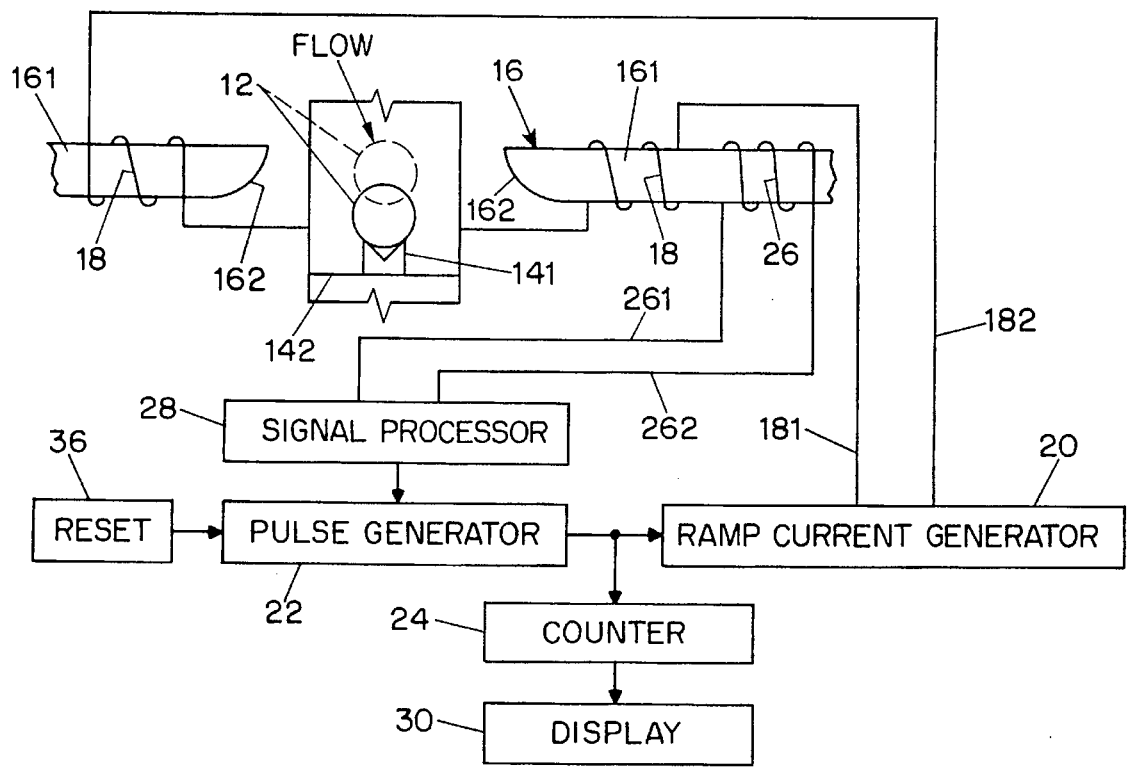
FIG. 1 is a schematic diagram of an embodiment in which changes in the rate of change of flux density in the electromagnet are detected by a multi-turn coil of an electrically conductive material.

Many of the elements of the embodiment shown in FIG. 1 and the manner in which they function are described and shown in the '255 patent, and reference may be made to that patent for a further understanding of the present invention. A conduit 10, which may oriented vertically, horizontally, or on a slope, receives a flowing fluid, the flow rate of which is to be measured. The conduit 10 is of a material that is not responsive to magnetic fields, such as certain metals (e.g., 304 stainless steel or aluminum or Monel metal), glass, quartz, a non-porous ceramic or a plastic, is of sufficient strength to contain the fluid and is of a composition that can endure the physical (e.g., temperature) and chemical (e.g., corrosive) conditions to which it is exposed by the fluid and the environment. The inside of the conduit may, alternatively, be coated with an inert material, such as "Teflon," to make it corrosion resistant. A body 12 of a magnetically-responsive material, such as 440 stainless steel, low-carbon steel or a metallic-glass alloy (e.g., "Metglas"), is accommodated in the conduit with a clearance from the conduit walls for fluid to flow past the body. The body 12 normally—under the influence of the fluid flow—rests on a non-ferromagnetic stop 14 having a seat 141 in by which the body is supported in the center of the conduit. The stop 14 is attached to the conduit walls by one or more radially extending support arms 142, which leave most of the annular flow path around the stop open for fluid flow. The body 12 and stop 14 may also be coated for corrosion resistance.

An electromagnet 16 having a core 161 with poles 162 and windings 18 is located outside the conduit. The poles 162 are located a few millimeters above the top of the stop 14 and about 0.5 millimeters from the outside wall of the conduit 10. During each measurement cycle, the windings 18 of the electromagnet are energized by a current supplied through leads 181, 182 by a current ramp generator 20, which generates a linear or fine-stepped ramp-up of the current, starting from nil or from a value below that which will produce a magnetic field sufficient to attract the body 12 with a force sufficient to lift the body from the stop against the force applied to it by the fluid flow (and the force due to gravity in a vertically oriented or sloped installation). The supplying of current to the electromagnet is initiated, and the ramp-up of current is controlled, by a pulse generator 22. The pulses from the pulse generator are counted by a counter 24. Inasmuch as the current supplied to the electromagnet and the pulses that control the current supply are related, the pulse count is a function of the current. The force exerted by the electromagnet on the body 12 is, in turn, a function of the current supplied to it. Accordingly, the count on the counter 24 is related to the force exerted by the electromagnet on the body 12.

When the force exerted by the electromagnet 16 on the body 12 exceeds the force applied to the body by the fluid flow (and by gravity and buoyancy, where applicable), the body is accelerated toward the electromagnet and away from the stop. As the body moves toward the gap between the poles 162, the reluctance of the flux path between the poles is progressively and rapidly decreased due to the short-circuiting of the gap by the magnetically responsive body. The resulting change in the flux field of the electromagnet is, according to one aspect of the present invention, detected and provides a sensing signal that is analyzed in a signal processor 28, as described below, so as to provide a stop signal that stops the pulse generator 22 and latches the counter 24.

In the embodiment shown in FIG. 1, the change in the magnetic field of the electromagnet caused by short-circuiting of the magnetic circuit when the body 12 is attracted into the gap between the poles 162 of the electromagnet 16 is detected by an electrically conductive wire coil 26 of several hundred turns wound around the core 16 of the electromagnet. The change in flux density in the core that occurs when the current is ramped up during a measurement cycle induces a voltage (EMF) in the coil 26, the magnitude of which is substantially proportional to the rate of increase in the magnetic field flowing in and adjacent to the core of electromagnet. The short-circuiting of the electromagnet upon movement of the body 12 away from the stop produces a change in the rate of increase in flux flow in the magnetic circuit 16. Suitable circuitry in the signal processor 28 connected by leads 261, 262 to the coil 26 filters and analyzes the voltage induced in the coil and outputs a stop signal to the pulse generator 22 when the increased rate of change in flux flow is detected.

Figure 2:
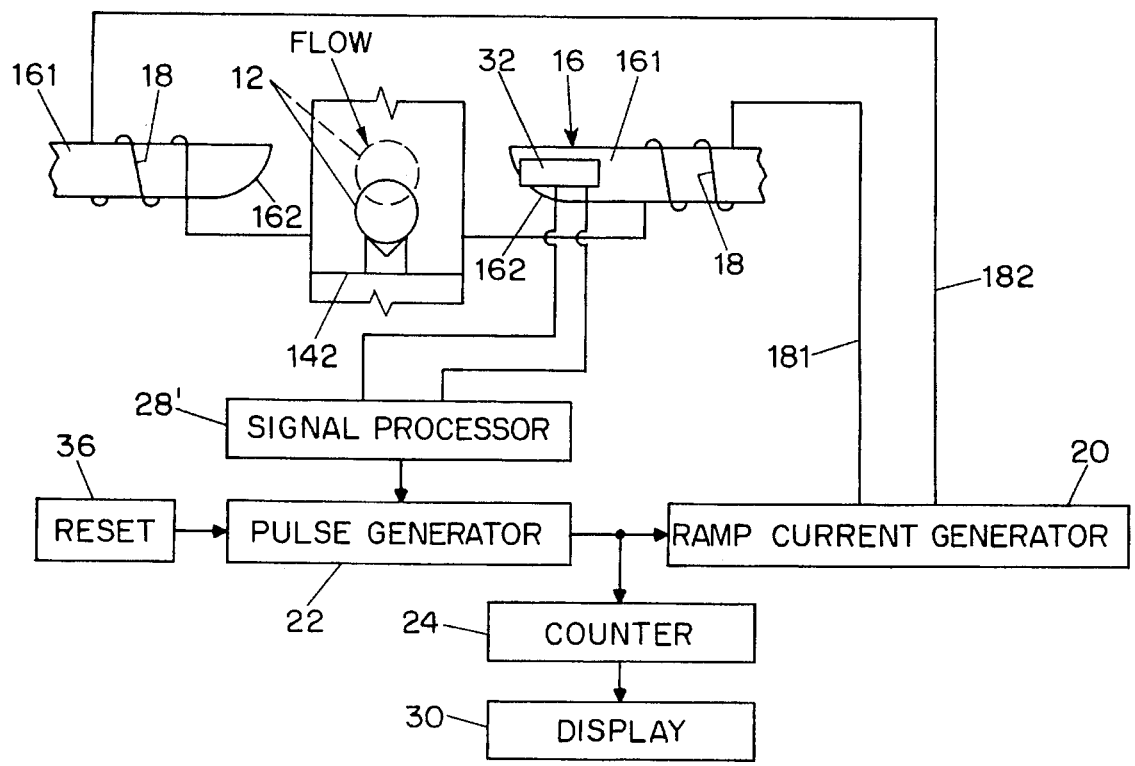
FIG. 2 is a schematic diagram of an embodiment in which changes in the rate of change of flux density in the electromagnet are detected by Hall effect sensor.

In the embodiment of FIG. 2, the change in the flux field indicative of the movement of the body 12 away from the stop 14 and toward the poles 162 is detected by a Hall effect sensor 32 interposed in the magnetic circuit such as to produce a change in the voltage output of the sensor that is consistent and measurable when the body reaches a certain point in the path between the rest position of the body against the stop and a rest position between the magnetic poles. Inasmuch as a Hall effect sensor detects changes in the flux lines that cut through its poles, the response of the sensor depends on its location and orientation in the magnetic circuit.

Figure 3A:
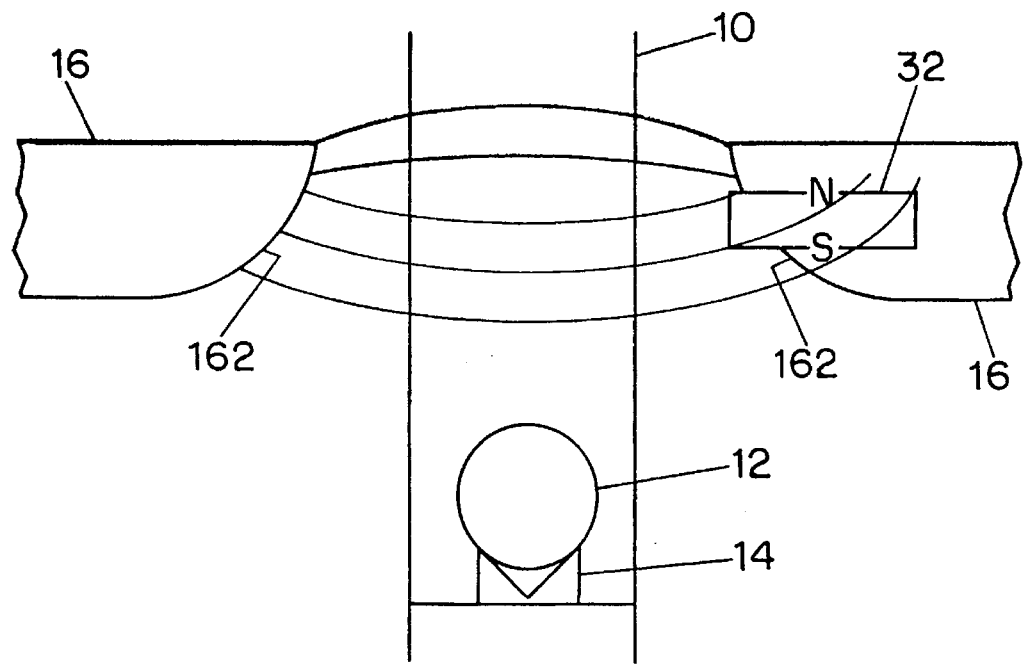
FIGS. 3A and 3B are diagrams illustrating one way of locating a Hall effect sensor to detect the position of a body and showing the manner in which the position of the body is sensed by the sensor.
Figure 3B:
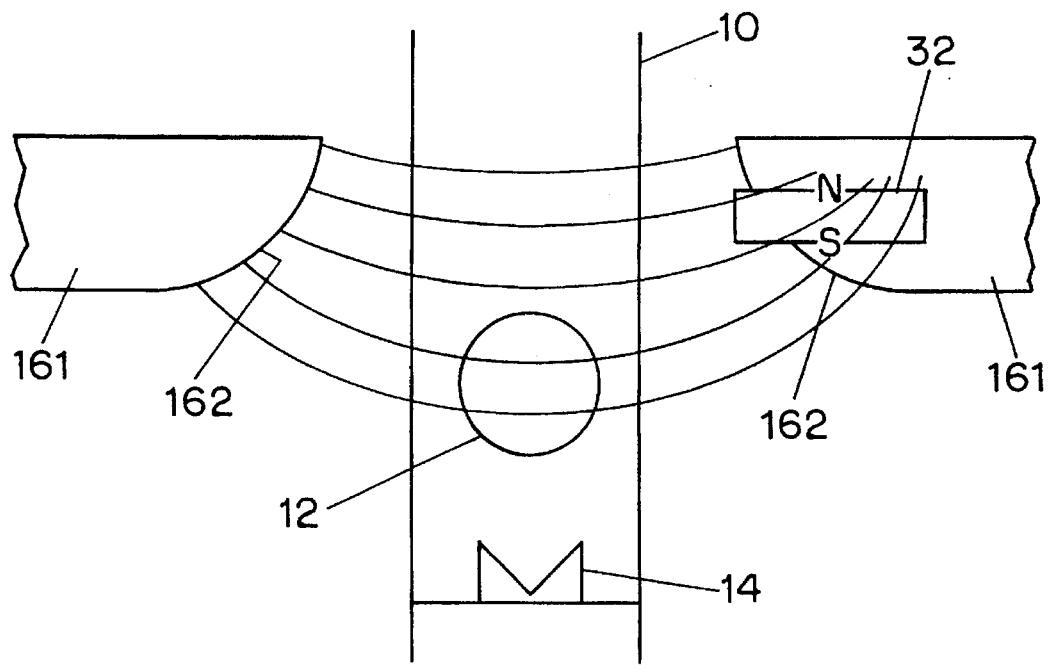

In the embodiment of FIG. 2, the Hall effect sensor 32 is located in a notch in one of the poles 162 of the electromagnet at a location and orientation such that the sensor's poles are cut by approximately equal numbers of flux lines as the flux density of the electromagnet increases during a measurement cycle, as shown in FIG. 3A. Thus, the Hall effect voltage remains essentially constant as long as the body remains at rest against the stop, even though the flux density and the size of the flux field between the electromagnet's poles is increasing. When the flux field between the poles 162 is short-circuited upon movement of the body 12 to a position close to the poles, the flux field between the poles is deflected, as shown in FIG. 3B, thus changing the pattern of flux across the sensor 26 and producing a change in the voltage output of the sensor.

Figure 4A:
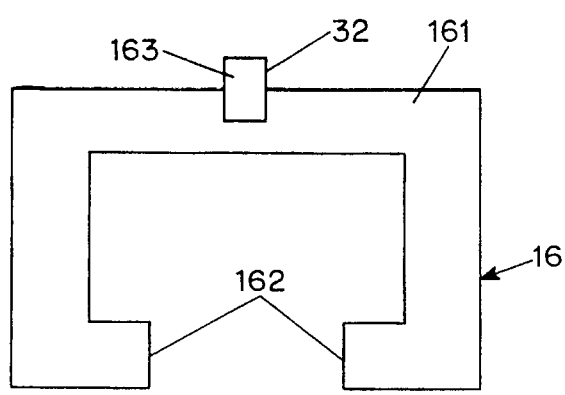
FIGS. 4A to 4C are diagrams illustrating another way of locating a Hall effect sensor, FIG. 4A being a top plan view of the core of the electromagnet and FIGS. 4A and 4B being detail plan views of a part of the core.
Figure 4B:
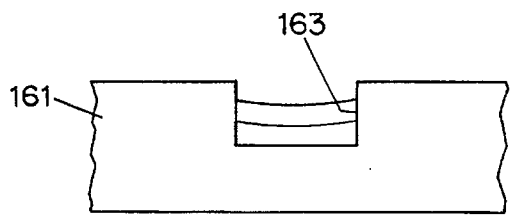
Figure 4C:
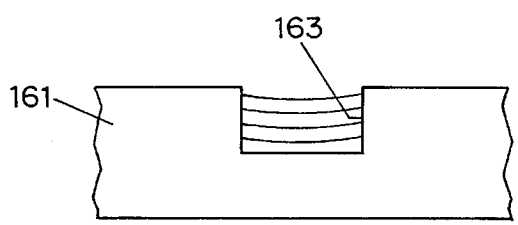

Another location for the Hall effect sensor 32, as shown in FIGS. 4A to 4C, is in a notch 163 in the core of the electromagnet remote from the poles. At lower currents and flux densities, relatively few flux lines pass through the notch (FIG. 4B). As the magnetic field strength in the circuit increases, increasing numbers of flux lines cross the gap, and the voltage in the hall effect sensor increases. When the gap between the poles 162 is short circuited by movement of the body away from the stop and into the gap between the poles, the rate of increase in the magnetic flux field in the core of the magnet changes sharply, and the flux flow across the notch, and thus through the sensor 32, increases correspondingly (FIG. 4C). The Hall effect sensor 32 responds by outputting a higher voltage signal. Locations and orientations for the Hall effect sensor other than those described above are possible.

Circuitry in a signal processor 28' (FIG. 2) filters and evaluates the voltage output of the sensor 32 and detects a change indicative of the arrival of the body at a certain point in the flux field, such as a peak sensor output voltage or a change in the rate of change in the sensor output voltage of a certain duration. When the indicated change in the Hall sensor voltage is detected by the processor, a signal is sent to the pulse generator 22 to stop generating pulses and latch the counter 24. The latching of the counter initiates the generation by display driver circuitry of a display 30 of a flow rate measurement. The pulse count signal from the counter can also, of course, be recorded and can be used to control a valve or pump to adjust the flow being measured. Pulse count signals from the counter for many measurement cycles can be stored in a memory, and average flow rates computed, displayed, used in controlling flow, and recorded, as desired.

Measurement cycles can be initiated manually by a push button (not shown) or automatically on a timed basis by a reset signal (reset 36) generated automatically by a timer after a time delay long enough for the body to move with the fluid flow back onto the stop and supplied to the pulse generator. Actual instrument output will, of course, be correlated to flow rates based on calibration data for particular fluids, temperatures, ranges of flow rates, and other variables. Conversion of measured counts of the counter may be made using calibration charts or by supplying the count data from each measurement cycle to a computer or microprocessor in which calibration data are stored and the count data are processed in accordance with the calibration data to produce actual flow rates for display, recording, and use. Where fluid temperatures or other conditions are significant variables in the measured flow rate, such conditions may be measured and input along with the count rate signals from the counter 24 to the computer or microprocessor.

As is known per se, the apparatus of the present invention can also be used in conjunction with other measurement devices and a microprocessor or computer to measure viscosities. By providing stops on opposite sides of an electromagnet in a horizontal tube, the apparatus can be used to measure flows in opposite directions (at different times).

Figure 5:
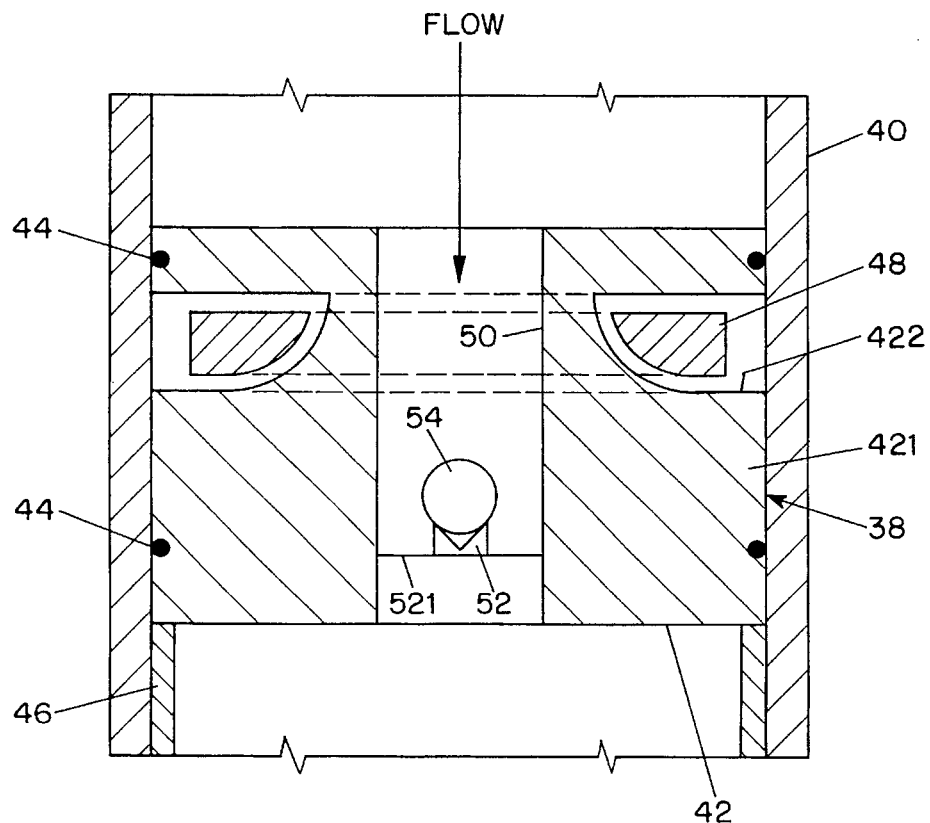
FIG. 5 is a generally schematic side cross-sectional view of a fluid flow-detecting unit suitable for installation in a pipe section or within a flow meter of another type.

FIG. 5 shows a measuring unit 38 that is suitable for installation in line in a tube 40 through which a fluid, the flow rate of which is to be measured, is flowing. The tube may, for example, be a portion of a tube of a rotameter, which is modified by shortening the flow tube section to accommodate the unit. The unit 38 includes a housing 42 of a non-ferromagnetic material having an outer wall 421 in sliding clearance with the wall of the passage and sealed to the passage wall by O-rings 44. The housing may be configured to seat at its lower end against an existing abutment or a spacer ring 46 or may be fastened in place in the tube 40 in any suitable manner. A cavity or notch 422 extends radially into and circumferentially part-way around the housing 42 and receives an electromagnet 48, the poles of which are on diametrically opposite sides of a flow conduit 50 in the form of a bore through the housing 42. A stop 52 supported by arms 521 receives a body 54 of the measuring unit. Movement of the body away from the stop is detected by a multi-turn coil or Hall effect sensor 54, as described above. The leads (not shown) of the coils of the electromagnet and the sensor may be routed through passages (not shown) leading to the bottom of the housing and out through a suitable sealed hole (not shown) in the tube 40 downstream from the unit.

We claim:

1. A flow meter comprising a conduit adapted to conduct a flow of a fluid, a stop in the conduit, a body movably received in the conduit, normally kept in engagement with the stop by the fluid flow, and including at least a portion of a magnetically responsive material, an electromagnet located outside the conduit in a position upstream from the stop relative to the direction of the fluid flow and having poles at a location such as to impose a magnetic force on the magnetically responsive material of the body when it is energized, means for energizing the electromagnet so as to progressively increase the magnetic force that it produces until the magnetic force is sufficient to move the body against the fluid flow and attract the body to a position between the poles, means for detecting changes in the magnetic flux field of the electromagnet when the body moves away from the stop and toward the electromagnet and producing a sensing signal indicative thereof, and means responsive to the sensing signal for detecting the magnitude of the current supplied to the electromagnet and producing a measurement signal indicative thereof.

2. A flow meter according to claim 1 wherein the detecting means includes a multi-turn coil of electrically conductive material wound around a portion of the electromagnet so as to have a voltage induced therein by the change in flux.

3. A flow meter according to claim 1 wherein the detecting means includes a Hall effect sensor mounted on the electromagnet.

4. A flow meter according to claim 3 wherein the Hall effect sensor is mounted in a recess in a pole of the electromagnet and is oriented such that its poles are intersected by different numbers of magnetic flux lines when the body is seated on the stop and when the body is moved from the stop by the magnetic force of the electromagnet.

5. A flow meter according to claim 3 wherein the Hall effect sensor is mounted in a recess in a portion of the electromagnet remote from the poles of the electromagnet so as to detect changes in the flux density when the body is moved from the stop by the magnetic force of the electromagnet.

6. A flow meter according to claim 1 wherein the conduit is a bore through a housing that is adapted be received within a tube through which the fluid is flowing, and the electromagnet and sensor means are mounted in the housing.

* * * * *